Patented Feb. 24, 1953

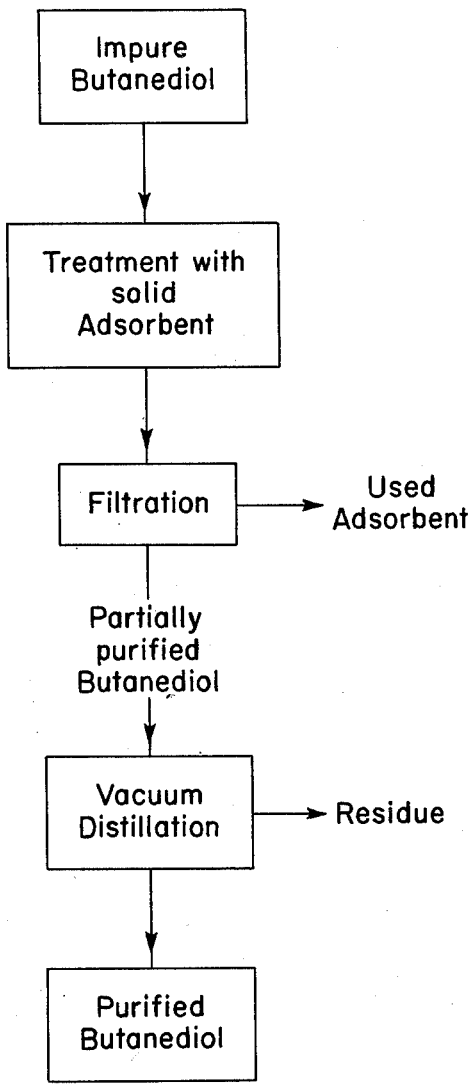

2,629,686

UNITED STATES PATENT OFFICE 2,629,686

PURIFICATION OF BUTANEDIOL

Frederick Grosser, North Plainfield, N. J., assignor to General Aniline & Film Corporation, New York, N. Y., a corporation of Delaware Application August 25, 1950, Serial No. 181,560

3 Claims. (Cl. 202—52)

This invention relates to purifying butanediol which comprises first treating technical butanediol with a solid adsorbent and then vacuum distilling the thus treated material.

Butanediol is prepared on a technical scale by catalytic hydrogenation of aqueous butynediol and recovering the thus formed butanediol by distillation. The product thus obtained is colorless and of high purity by chemical analysis. However, it has been found that there are present in the distillate product some impurities which cannot be removed by further distillation but which interfere with many applications of the butanediol. The presence of such impurities is indicated by a low melting point and the formation of color, varying from pink to dark brown or black when a sample of the butanediol is shaken with an equal volume of concentrated hydrochloric acid. Pure butanediol does not discolor when shaken with an equal volume of hydrochloric acid and this test has been found to be a more sensitive indication of the presence of smaller amounts of impurities than chemical analysis.

It has been found that butanediol can be obtained in a pure form by rehydrogenating the technical butanediol and then redistilling it. While butanediol is thus obtained in a very pure form which is free of HCl color formers, this procedure is quite costly.

We have now found that by treating technical butanediol, (which contains HCl color formers and which has been obtained by distillation of the product resulting from catalytic hydrogenation of aqueous butynediol), with a solid adsorbent and then vacuum distilling the thus treated butanediol after filtration, the distillate thus obtained is pure butanediol, free of HCl color formers. A pure product is thus obtained simply and economically. By following this procedure, a much purer product is obtained, as will be apparent from the detailed description below, than can be obtained from technical butanediol by further vacuum distillation alone, treatment with solid adsorbents alone or by treatment with solid adsorbents preceded by vacuum distillation.

In the drawings accompanying the present application the single figure is a diagrammatic flow chart illustrating the process of the present invention.

Details of the present invention will be apparent to those skilled in the art from a consideration of the following specific example:

500 parts by weight of technical butanediol-1,4 which had been obtained by vacuum distillation of the product obtained by catalytic hydrogenation of aqueous butynediol, were agitated with 35 parts by weight of an acid treated activated carbon, i. e., Nuchar at 50° C. for one hour. After the carbon had been removed by filtration, the filtrate was distilled under reduced pressure through a 1" x 24" Vigreux column at 60% reflux ratio. There was thus obtained, as the distillate, pure butanediol-1,4 which was free of HCl color formers and suitable for use in applications where material containing HCl color formers was objectionable. This purified butanediol-1,4 was tested for purity by shaking a sample thereof with an equal volume of concentrated hydrochloric acid. On measuring the resultant color with a Hellige varnish comparator, the product was found to have a Hellige color of one although when shaken with an equal volume of HCl the technical butanediol-1,4 from which it was obtained had a Hellige color of 18+ and a sample withdrawn after filtration, i. e., after treatment with the activated charcoal but without distillation, developed a Hellige color of 18.5. Likewise, the distillate obtained on vacuum distillation of a sample of the same technical butanediol-1,4 developed a Hellige color of 12.5 to 13.5 when shaken with an equal volume of HCl, treatment of this last distillate with activated charcoal effected no further improvement.

As examples of solid adsorbents, which may be used in place of the activated charcoal employed in the foregoing example, may be mentioned acid treated silica gel, fuller's earth and similar solid adsorbents.

I claim:

1. A process for purifying technical butanediol-1,4 which comprises treating technical butanediol with a solid adsorbent selected from the group consisting of activated charcoal, acid treated silica gel and fuller's earth, separating the thus treated butanediol from the adsorbent and vacuum distilling the thus treated butanediol.

2. The process as defined in claim 1 wherein the treatment with a solid adsorbent is effected at about 50° C.

3. The process as defined in claim 1 wherein the solid adsorbent specified is activated charcoal.

FREDERICK GROSSER.

REFERENCES CITED

The following references are of record in the file of this patent:

UNITED STATES PATENTS

| Number | Name | Date |
|---|---|---|
| 2,319,707 | Reppe | May 18, 1943 |
| 2,472,912 | McCarter | June 14, 1949 |

OTHER REFERENCES

Rao et al., "Studies in Adsorption on Gels," Proceedings, Indian Academy of Sciences, vol. IV-A, pp. 562–570.